(12) United States Patent
Kain

(10) Patent No.: US 7,296,485 B2
(45) Date of Patent: Nov. 20, 2007

(54) LOAD CELL INCLUDING DISPLACEMENT TRANSDUCER, AND ASSOCIATED METHODS OF USE AND MANUFACTURE

(76) Inventor: Aron Kain, 5 Cottonwood La., Suffern, NY (US) 10901

( * ) Notice: Subject to any disclaimer, the term of this patent is extended or adjusted under 35 U.S.C. 154(b) by 0 days.

(21) Appl. No.: 10/582,023

(22) PCT Filed: Feb. 18, 2005

(86) PCT No.: PCT/US2005/005442

§ 371 (c)(1),
(2), (4) Date: Jun. 8, 2006

(87) PCT Pub. No.: WO2005/081907

PCT Pub. Date: Sep. 9, 2005

(65) Prior Publication Data

US 2007/0119266 A1 May 31, 2007

Related U.S. Application Data

(60) Provisional application No. 60/546,498, filed on Feb. 20, 2004, provisional application No. 60/641,719, filed on Jan. 6, 2005.

(51) Int. Cl.
*G01L 1/22* (2006.01)
(52) U.S. Cl. ............... 73/862; 73/862.333; 73/862.08
(58) Field of Classification Search ........... 73/862, 73/862.333, 862.26, 862.08
See application file for complete search history.

(56) References Cited

U.S. PATENT DOCUMENTS

| | | | | |
|---|---|---|---|---|
| 3,066,267 A | * | 11/1962 | Menhennett | 333/232 |
| 3,618,376 A | | 12/1969 | Shull et al. | |
| 3,636,752 A | * | 1/1972 | Ishii | 73/514.16 |
| 3,909,713 A | * | 9/1975 | Billeter | 324/636 |
| 4,064,744 A | | 12/1977 | Kistler | |
| 4,237,989 A | | 12/1980 | Lewis | |
| 5,261,278 A | | 11/1993 | Kain | |
| 5,546,806 A | | 8/1996 | Kain | |

OTHER PUBLICATIONS

International Search Report and Written Opinion dated Aug. 25, 2006 from the corresponding International Application PCT/US2005/005442.
International Preliminary Report on Patentability dated Nov. 1, 2006 from the corresponding International Application PCT/US2005/005442.

* cited by examiner

*Primary Examiner*—Andre J. Allen
(74) *Attorney, Agent, or Firm*—Katten Muchin Rosenman LLP

(57) ABSTRACT

A load cell reacts to an applied force by displacing a physical component of the load cell. An electrical component of the load cell produces an electromagnetic (EM) field in response to an applied radio frequency signal. The physical component is located in proximity to the EM field, and perturbs the EM field without physically contacting said electrical component structure. A displacement of the physical component results in a change to the perturbation of the EM field. A monitoring circuit of the load monitors an output signal that is affected by change to the perturbation of the EM field, and thereby detects the applied load.

38 Claims, 12 Drawing Sheets

LOAD CELL INCLUDING DISPLACEMENT TRANSDUCER, AND ASSOCIATED METHODS OF USE AND MANUFACTURE

CROSS-REFERENCE TO RELATED APPLICATION

This application is a National Phase Application of International Application No. PCT/US2005/005442, filed Feb. 18, 2005, which claims priority under 35 U.S.C. 119 (a-e) of U.S. Provisional Application No. 60/546,498, entitled "Displacement Transducer for Load Cells, Pressure Sensors, Accelerometers, Velocity Meters, and Flow Meteres," filed Feb. 20, 2004, and U.S. Provisional Application No. 60/641,719, entitled "Displacement Transducer For Load Cells, Pressure Sensors, Accelerometers, Velocity Meters and Flow Meters", filed Jan. 6, 2005. Each of these provisional applications was filed by an inventor common to the present application, and each application is hereby wholly incorporated by reference.

FIELD OF THE INVENTION

This invention relates to force measuring transducers, and more particularly to load cell devices. Even more particularly, this invention relates to a load cell monitoring a displacement of a physical component of the load cell present in an electromagnetic field according to the effect of the displacement on perturbing the field.

BACKGROUND OF THE INVENTION

Force measuring transducers such as load cells, are well known in the arts. Many different sensing technologies have been used in load cell transducers, such as strain gauge sensing, capacitive sensing, force balance sensing, and variable reluctance sensing. These sensing technologies are well known in the arts. An example of a strain sensor used in load cell manufacturing is described in U.S. Pat. No. 4,064,744, "Strain Sensor extensiometer" to Kistler, while a capacitive sensor is described in U.S. Pat. No. 4,237,989, "Capacitive Load Cell And Method Of Manufacture" to Lewis.

In a related area, acceleration transducers have been described comprising a probe placed in resonant microwave cavity (see, e.g., U.S. Pat. No. 5,546,806, "Microwave Vector Displacement and Acceleration Transducer" to Kain and U.S. Pat. No. 5,261,278, "Microwave Acceleration Transducer" to Kain, each of which is hereby incorporated by reference). An acceleration of the cavity displaces the probe, which causes a variation in the radio frequency (RF) resonant modes of the cavity. The mode changes are then correlated with acceleration values. In comparison to conventional sensors employed for load cell technology, these accelerometer transducers provide the advantage of having an electric signal-generating component that is physically decoupled from the mechanical component of the device.

It would be advantageous if the electric signal-generating components of other displacement-based devices could be physically decoupled from the mechanical components undergoing displacement.

SUMMARY OF THE INVENTION

In accordance with the principles of the present invention, a force measuring transducer is disclosed that operates by producing a physical displacement effect. The force measuring transducer includes a physical component displaced by operating the sensing device, an electrical component structure that produces an electromagnetic (EM) field in response to an applied radio frequency signal, and a monitoring circuit for monitoring an output signal affected by the EM field to detect an operation of the sensing device according to a change in the output signal. The physical component is positioned in proximity to the EM field generated by the electronic component structure, such that it perturbs the EM field without physically contacting said electrical component structure. A displacement of the physical component results in a change to the perturbation of the EM field, and thereby, to a change in the output signal.

A variety of well-known electrical component structures may be used to generate and sense the EM field and it's perturbation. For example, planar pancake coils, interdigitated capacitors, and distributed transmission structures (e.g., transmission lines, antennas and other structures formed having transmission path lengths that are a predetermined fraction or multiple of an associated operating frequency wavelength) may be employed in various circuit configurations as resonators, filters, impedance matching networks, and the like.

The physical component can be made from a great variety of materials so long as the characteristic of the selected material will perturb the EM field. For example, suitable materials may be found to include metals, plastics, wood, ceramics, frozen liquids, brick, and biological materials (for example, such as bone). The disclosed transducer may also be used in a variety of applications, for example, including load cells, and pressure, acceleration, velocity, torque, rotational, and displacement sensors. The monitoring circuit may operate to convert the sensed perturbed EM field into an amplitude, frequency, phase, electrostatic signal, magnetostatic signal, or combination of these to sense the effect of the perturbed EM field.

The electrical component structure and monitoring circuit are preferably mounted in a variety of applications to a mounting block which can be removably attached to the mechanical portion of the transducer including the physical component. In this manner, for example, the electrical and mechanical components of the transducer may be separately manufactured and tested prior to assembly. In addition, the mechanical components can accordingly be designed to be extendable and replaceable so that, for example, various ranges of applied forces can be sensed without requirng a redesign of the electrical components. The invention contemplates a wide range of acceptable geometries for the mechanical components, including for example single point beam, dual beam, S beam, pancake, compression/tension canister, rod, and mini-pancake geometries.

BRIEF DESCRIPTION OF THE DRAWINGS

A more complete understanding of the invention may be obtained by reading the following description of specific illustrative embodiments of the invention in conjunction with the appended drawing in which.

DETAILED DESCRIPTION

At the heart of the disclosed inventive transducer is the displacement sensing mechanism. In this sensing mechanism, we employ the use of high frequency structures that allow the electromagnetic (EM) field that characterizes them to "leak" out into the surrounding environment. Since the fields "leak" out, they are perturbed by any dielectrics, conductors, or semiconductors that are within the range of these fields. Hence the displacement of these perturbing objects manifest themselves as changes in the "leaky" fields. By sensing the changes in these "leaky" fields, we can sense the displacement of the perturbing object.

Many such structures, if designed properly, can exhibit this leaky field behavior. For example, capacitors, inductors, and transmission lines can all be constructed in such a way as to allow the EM fields to "leak" out while still maintaining the integrity and functionality of the structure.

Figure 1:
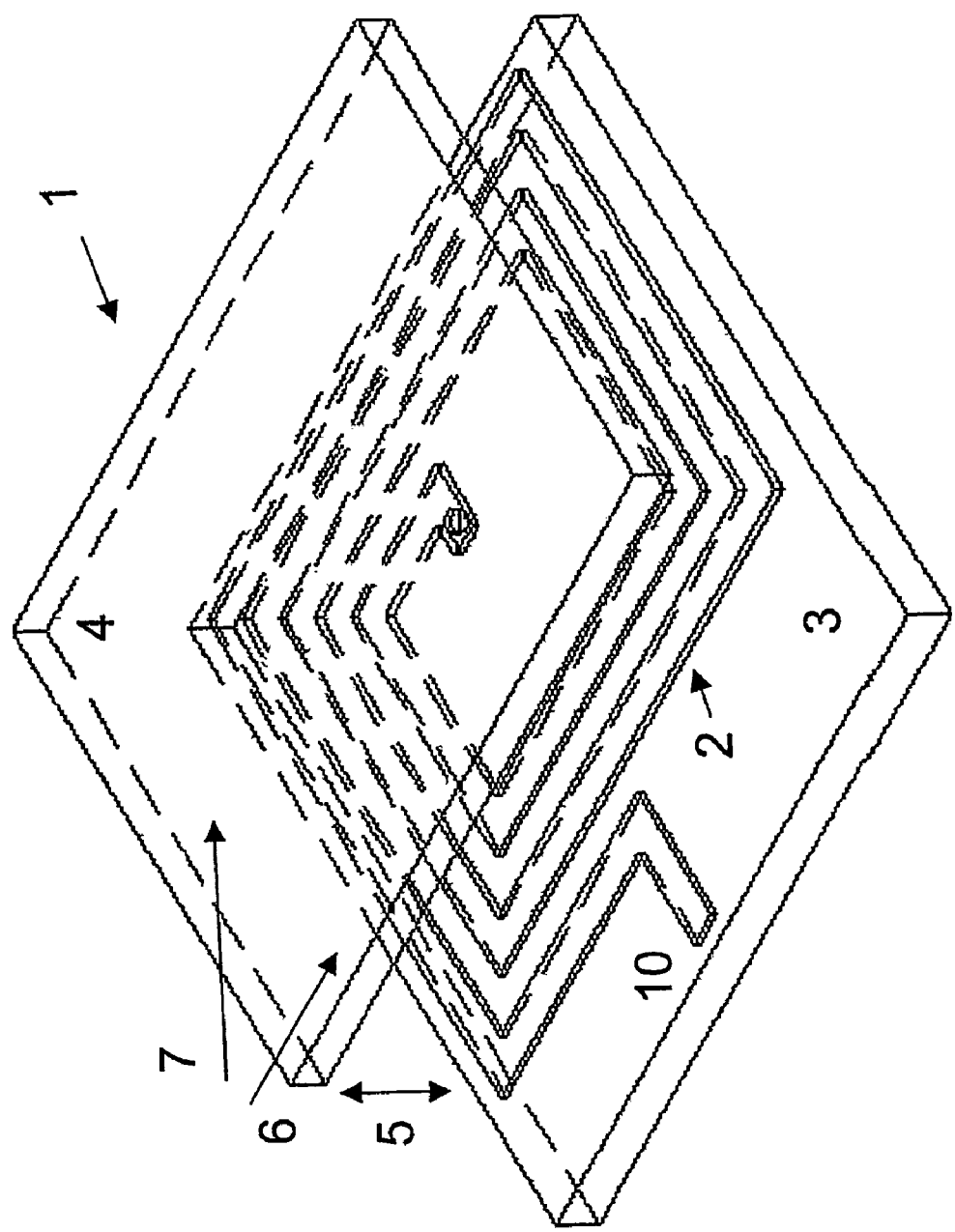
FIG. 1 is an isometric view of a typical resonator structure used to generate and sense the EM filed perturbation.

As shown in FIG. 1, an embodiment of the present invention employs the use of a spiral resonator 1. This spiral resonator is a high frequency device of etched metal in a spiral inductor pattern 2, mounted on a suitable substrate 3. The resonator has an input for RF energy that is supplied to the structure 10. Those skilled in the high frequency arts are very familiar with this structure.

The spiral resonator is such that it resonates at the frequency where the reactances of the coupling capacitances between the spiral turns and the reactances of the inductance of those turns, identically cancel. This is the classical definition of resonance. However, because the planar structure is an open structure i.e. non-transverse electromagnetic (TEM) or quasi-TEM, the fields generated by the high frequency applied to the resonator "leak" out into the environment.

As a conductor, insulator, or semiconductor object (such as object 4 of FIG. 1) is brought within close proximity to the resonator, the fields are perturbed, thereby changing the resonator's resonance frequency (see, e.g., U.S. Pat. Nos. 5,546,806 and 5,261,278). Additionally, the conductor, insulator, or semiconductor object 4 can be manipulated in such a way as to also control the resonators phase and amplitude. It is this effect of perturbing the electromagnetic fields that allows the present disclosure to sense the displacement of the metal object. The conductor, insulator, or semiconductor object can perturb the field in a vertical 5, horizontal 6, or vector 7 direction as shown in FIG. 1.

Figure 2:
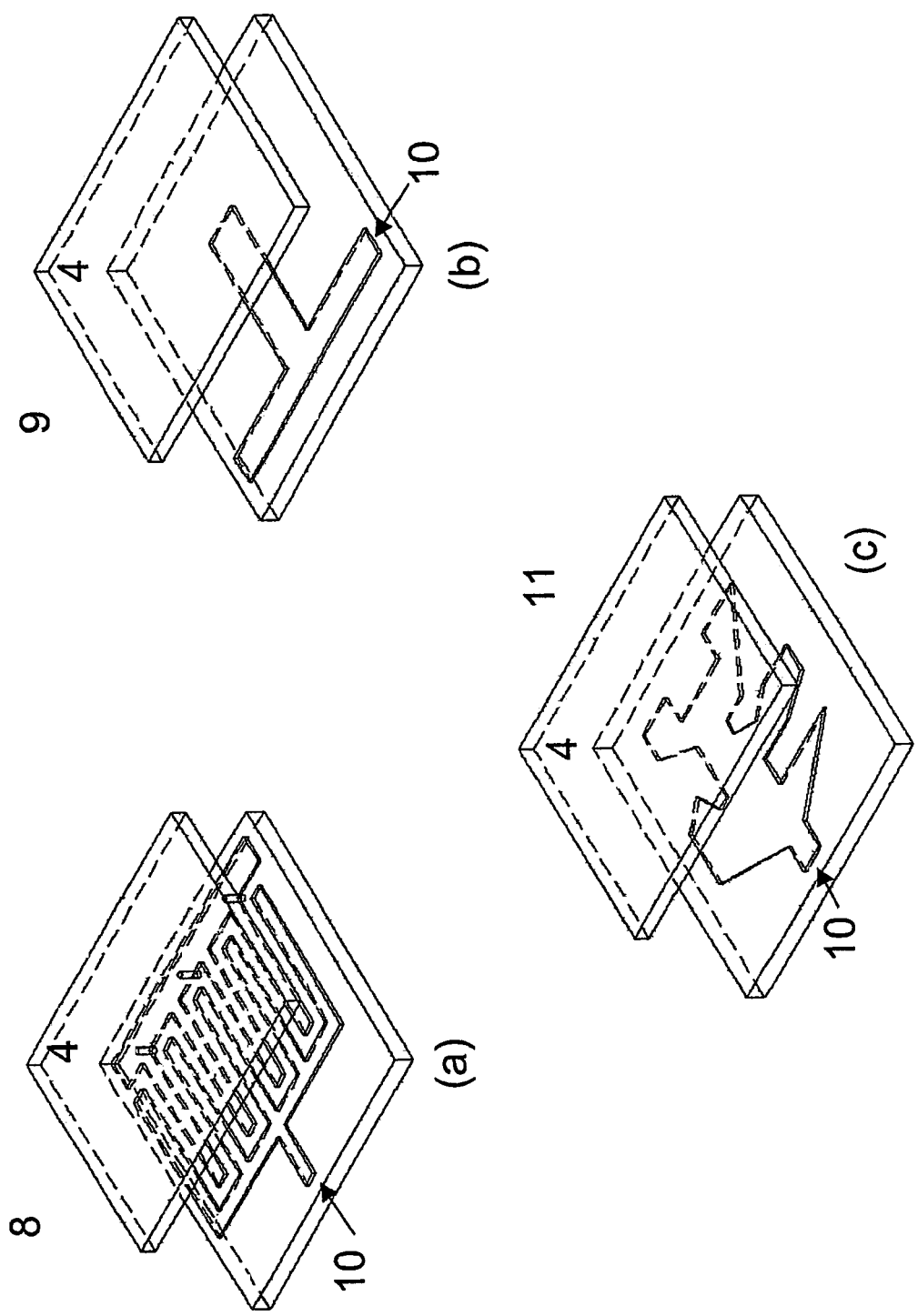
FIG. 2 are alternate structures that also are capable of generating and sensing the EM filed perturbation.

Alternatively, at a frequency well below the self-resonant frequency of the spiral resonator, the structure can be used as a simple inductor. This lower frequency usage would then require the parallel connection to a capacitor of suitable value in order to form a well known LC resonator. Again the perturbing object 4, acting on the EM field of the spiral resonator serving as a simple inductor 2, will affect the desired displacement sensing. Equally as compelling, as illustrated in FIG. 2, one can use an interdigital capacitor structure 8, a simple open end transmission line stub 9 or an arbitrary planar structure 11, with the accompanying perturbing object 4 and RF energy input 10, to also sense the perturbed EM field. Without loss of generality, any such structures well known within the arts, whereby the EM fields that are associated with that structure can "leak" out into the surrounding environment, can be used for such sensing capabilities.

Additionally, the planar structures used can be designed such that the desired sensing of the displacement and corresponding electrical signal output have a well defined relationship. This relationship can be designed to be linear for applications that require linear sensing, and can be designed toe exhibit other relationships for other applications.

Figure 2A:
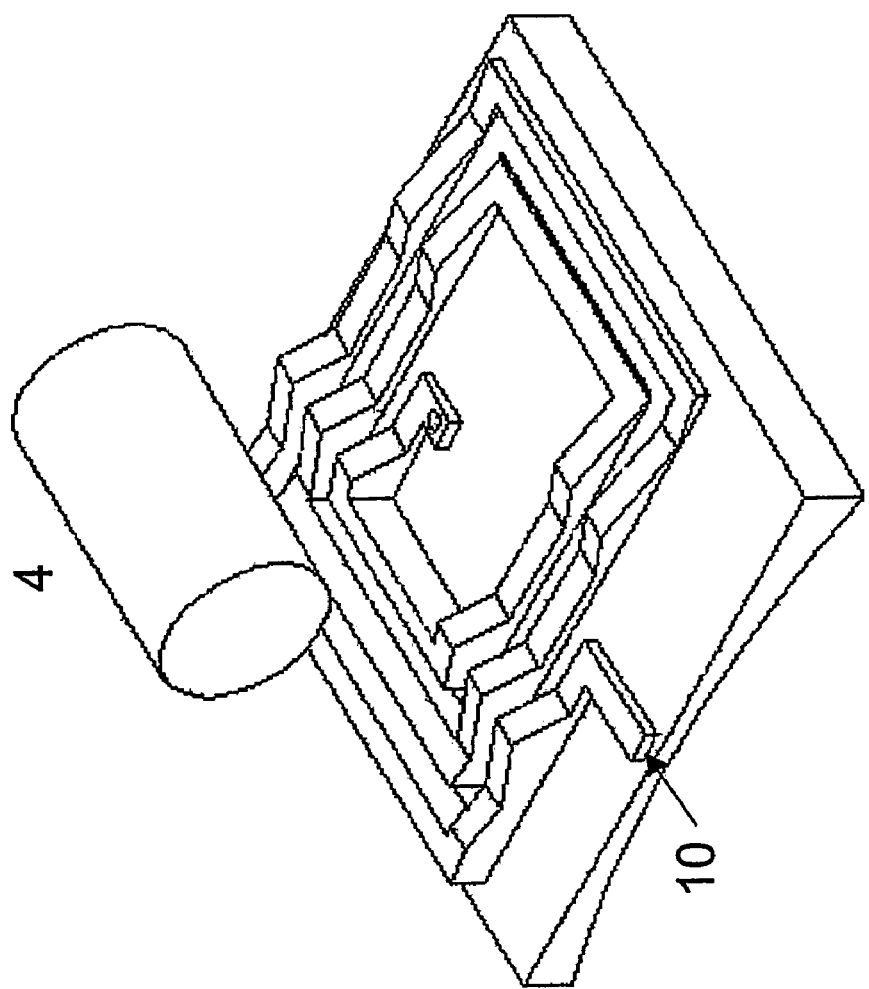
FIG. 2A is 3-D arrangement for non planar structures and perturbers capable of generating and sensing the EM filed perturbation.

For purposes of illustrating the principles of the present invention, without loss of generality, a planar structure resonator 1 and planar perturber 4 are used. This planar-planar geometry selection is only a single implementation of a more general 3D-3D geometry selection of the invention for which the sensing of the perturbed EM fields remains valid. An example 3D-3D geometry selection is illustrated in FIG. 2A as containing the cylindrical perturber 4 and the a non planar structure having RF energy input 10. Those skilled in the art will find that an infinite variation of geometries are possible for both the EM sensing structures as well as the perturbing structures that comprise a suitable displacement sensing topology.

Figure 3:
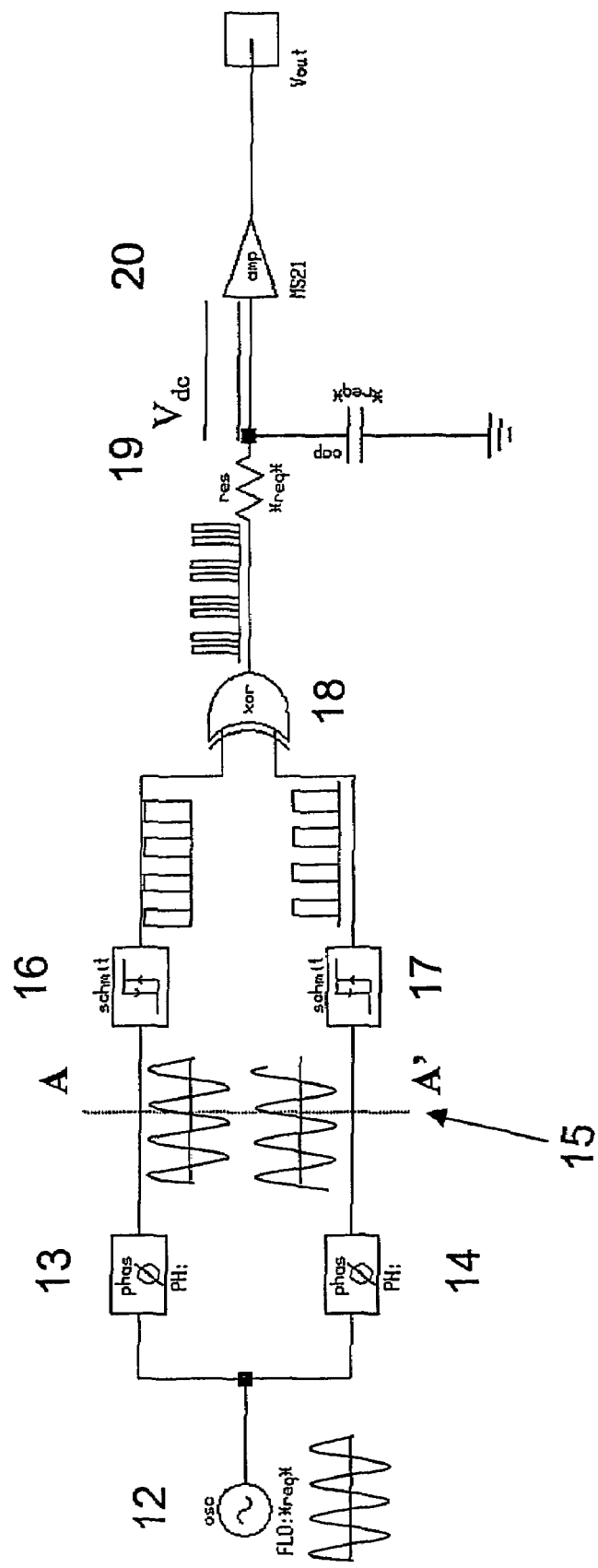
FIG. 3 is one preferred embodiment of the overall sensing electronics.

Continuing forward with the planar resonator embodiment, the resonator is then incorporated within an electronic circuit that can capture and output the resulting perturbation of the EM field. One such circuit block diagram is shown in FIG. 3. Here, the detection method is phase comparison. In this implementation we use two identical resonators, each situated on opposite traveling displacement points within the mechanically deflecting transducer. Hence, as one part of the mechanically deflecting transducer approaches the first resonator, it is equally an oppositely receding from the second resonator by an identical amount. Therefore, the two resonators act as a differential pair that minimizes such common mode effects as temperature, aging, and creep associated with the transducer environment. This implementation also results in improving the linearity of the sensing mechanism for sensing displacement.

The circuit of FIG. 3 operates as follows. An RF energy source 12 provides a signal that is split so that part of the signal travels through resonator 13 and part through resonator 14. Both resonators are identical in electrical characteristics. The RF frequency is chosen to coincide with the resonant frequencies of both resonators. The ideal condition for maximum sensitivity would have the signals entering the resonator to be in phase quadrature, however, any initial phase relationship is acceptable. After the signals pass through the resonators, depending on how the EM fields have been perturbed, the phase relationship between the resonators will have changed. As the EM fields continue to be perturbed by the deflection or displacement of the transducer this phase relationship will continue to change. Hence, the phase relationship at point A-A' 15 in the circuit accurately represents the displacement of the transducer, and hence the load to be measured in the case that the transducer is associated with a load cell.

The two signals are then passed though devices 16 and 17 that convert the sine waves (fundamental frequencies) of the resonators 13, 14 to square waves. Devices such as Schmitt Trigger Inverters are adequate for this function. The output of devices 16 and 17 are then fed into an Exclusive OR (XOR) 18 which serves as a phase detector. This method of phase detection is well known in the arts, particularly as associated with the design of Phase Locked Loops. The output of the XOR 18 is then a Pulse Width Modulated (PWM) signal that is directly proportional to the phase relationship 15 between resonators 13, 14. This PWM signal is then passed through a low pas filter (for example, RC circuit 19) which converts the PWM into a DC signal that varies according to the phase relationship 15, and hence, with the load applied to the transducer. An OpAmp 20 follows the low pass filter to provide buffering of the output as well as amplification if required. The output is now ready to be used by downstream electronics such as a microprocessor or microcontroller as well as user specified equipment. Although this embodiment uses a differential measurement approach, nothing precludes the use of a single ended measurement approach whereby a single resonator is used.

Figure 4:
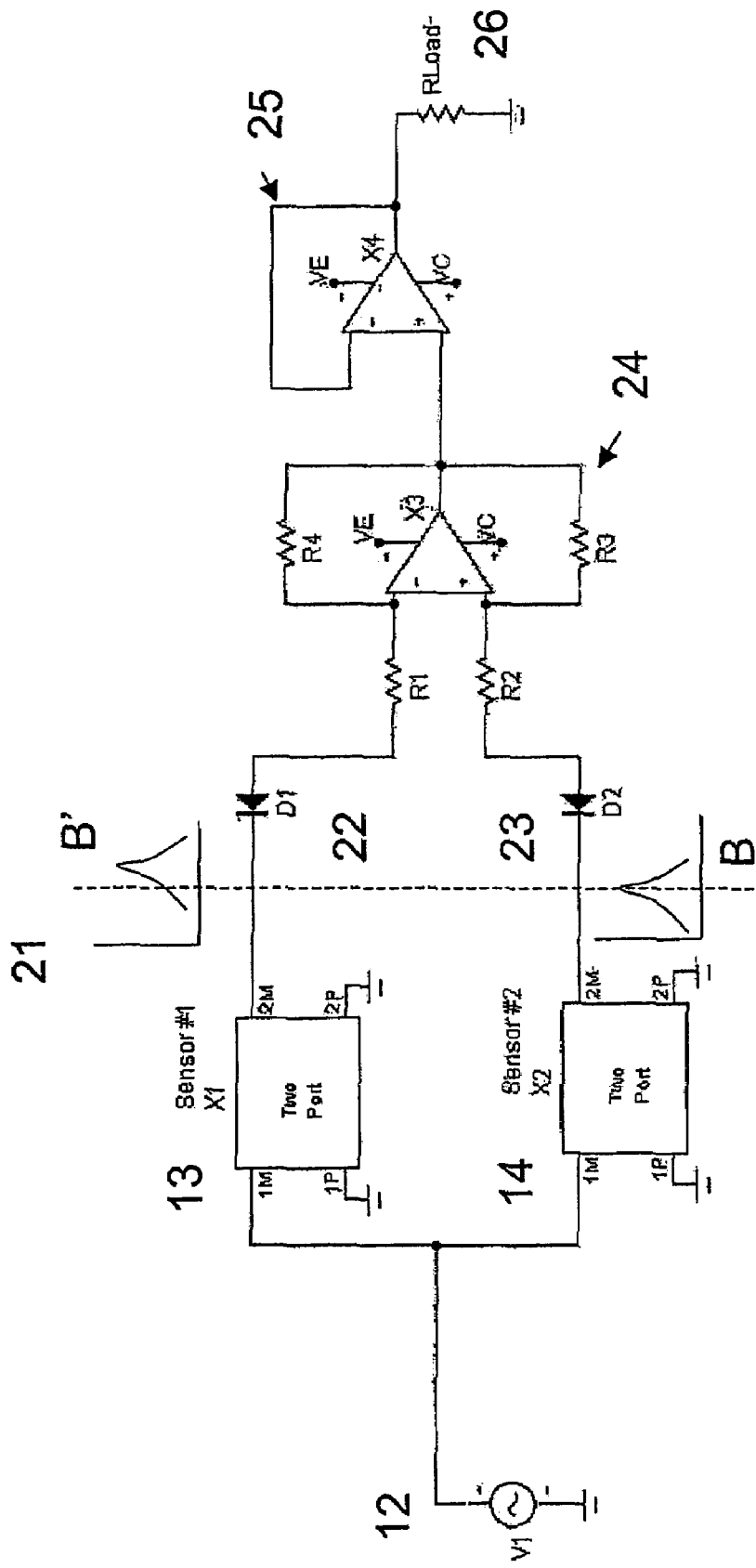
FIG. 4 is another preferred embodiment of the overall sensing electronics.

In order to illustrate the independence of the measurement technique on the specific circuit topology chosen, a second detection circuit, based on amplitude measurement, is presented in FIG. 4.

The circuit of FIG. 4 operates as follows. An RF energy source 12 provides a signal that is split so that part of the signal travels through resonator 13 and part through resonator 14. Both resonators are identical in electrical characteristics. The RF frequency is chosen to not coincide with the resonant frequencies of both resonators, so that the amplitude of the chosen frequency is not at its peak (i.e., the amplitude is on the slope of the resonance amplitude versus frequency curve). After the signals pass through the resonators 13, 14, depending on how the EM fields have been perturbed, the amplitude relationship between the resonators will have changed. As the EM fields continue to be perturbed by the deflection or displacement of the transducer this amplitude relationship will continue to change. Hence, the amplitude relationship at point B-B' 21 in the circuit accurately represents the displacement of the transducer and hence the load to be measured. Diode detectors 22 and 23 capture the amplitude at the operating frequency of RF energy source 12. The differential amplitude is then amplified by the differential amplifier 24 and then passed to the voltage follower 25 to be output to user electronics represented by the load resistor 26.

Figure 11:
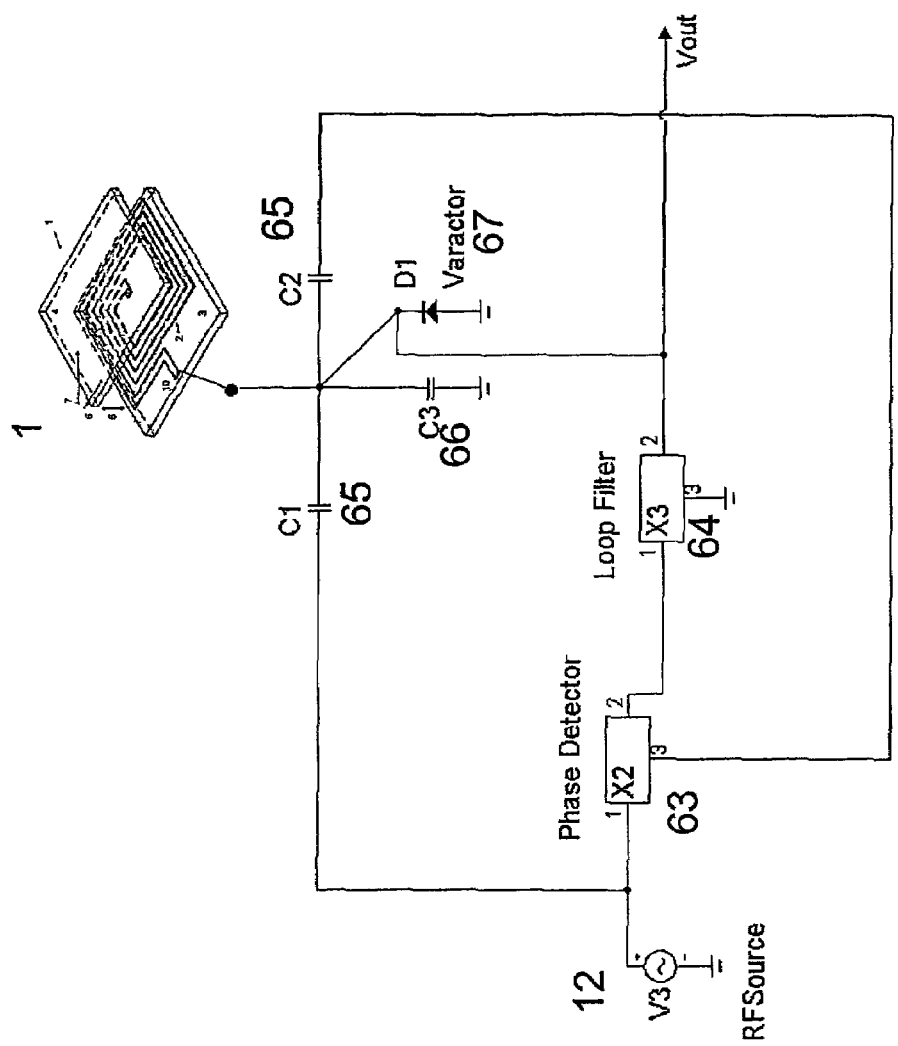
FIG. 11 is one preferred embodiment of the overall Phase Locked Loop sensing electronics.

As a further detection circuit implementation, a Phase Locked Loop topology can be used as shown in FIG. 11. The output signal of an RF energy source 12 is split so that the signal is input to port 1 of the phase detector 63 as well as the resonator coupling capacitor 65. The signal is then passed through the resonator assembly comprising of coupling capacitors 65, resonator capacitor 66, varactor 67, and spiral inductor 1. Capacitor 66 and spiral inductor 1 are used to create an LC resonator as taught herein. Capacitor 66 can be eliminated if spiral inductor 1 is used at its self-resonance frequency, thereby converting spiral inductor 1 into spiral resonator 1, as is well known in the arts.

After the signal passes through the resonator assembly 65, 66, 67, 1, the phase of the signal will have undergone a change dependent on the displacement of the perturbing object as taught herein. This phase changed signal is then fed back into port 2 of the phase detector 63, and is compared with the initial phase of the RF energy source 12. Any phase difference is output from the phase detector port 3 and is fed into the loop filter 64. This voltage error signal, indicating the phase difference between port 1 and port 2 of the phase detector 63, is fed to the varactor 67. The voltage on the varactor 67 then tunes the resonator assembly so that the phase difference at output from the phase detector 63 is reduced to zero. This is the well known operating principle of phase locked loops. Hence, by monitoring the voltage error signal (i.e. the voltage required in order to have the resonator assembly match the phase of the RF source 12), we obtain a simple signal that is proportional to the phase of the resonator assembly and hence, the displacement effect of the perturber on the EM field.

It is therefore apparent that the same EM field perturbation may be sensed using a variety of topologies while using the identical topology for the actual sensing structure such as the spiral resonator 1.

It is also apparent that the circuitry required to achieve the desired goal of transducing the displacement of the mechanically deflecting structure, may be straight forward, simple, and with little complexity. This therefore allows the circuitry to be cheaply fabricated, provide robust endurance and reliability, as well as lend itself to small/miniaturized size. As a particular result of measured performance of the differential phase detection approach described with reference to FIG. 3, our load cell has a zero load signal of 1V and a full scale detection range of 0.15 V exhibiting 0.2% linearity, without the need for further amplification and signal processing. Furthermore, the noise performance of our device is such that when measured in a standard data acquisition instrument our Effective Number of Bits is 20. As the output voltage is high and the performance is rather quiet, the output of the circuit can be directly fed into a microprocessor or microcontroller. Such a device can be placed directly on the same circuit board as the transducer electronics, so that the output of the overall transducer, i.e. what the end user connects to, can be a purely digital, computer ready data stream. This direct connect capability is not possible with current state of the art load cell transducers as the output voltages from the sensor itself are on the order of millivolts, and require specialized circuitry for amplification and signal conditioning in order for the signal to be acceptable for current microprocessor or microcontroller use.

It is also apparent that as the resonator is supplied with RF energy, a suitable antenna structure may be combined with the resonator forming a wireless, passive link to a remotely located portion of the circuit outlined in FIGS. 2 and 3. This is illustrated, for example, in FIG. 5.

Figure 5:
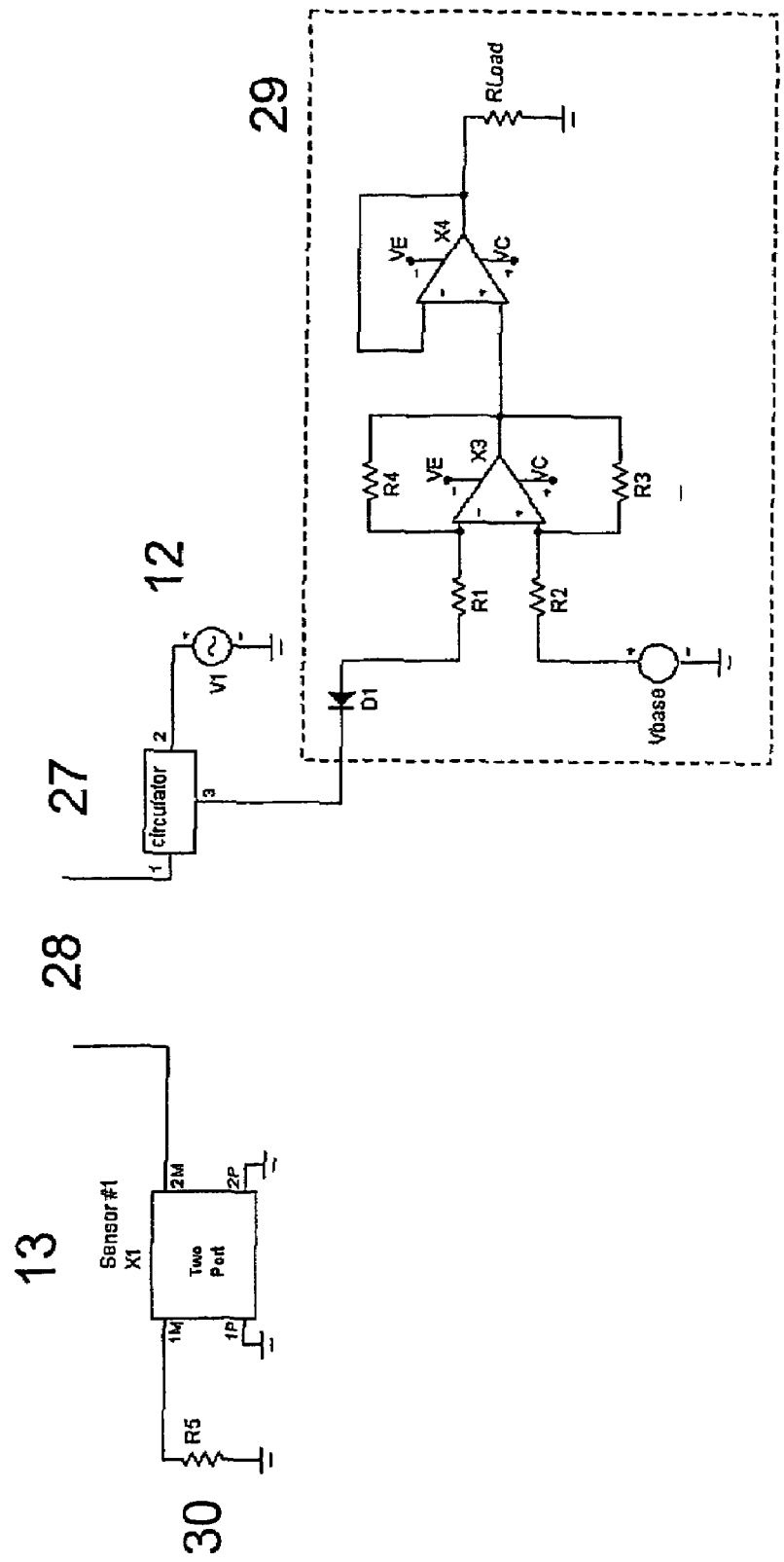
FIG. 5 is one preferred embodiment of the overall wireless sensing electronics.

In FIG. 5, the RF signal from RF energy source 12 is routed into a circulator 27. The RF signal is then routed to the antenna at port 1 of circulator 27 and propagates to the antenna of resonator 13, forming a RF link 28. The signal passes through the resonator 13 and is properly terminated in the load resistor 30. A reflected signal then traverses the same path back to the circulator 27 and couples into circuit 29 (a single ended version of the circuit of FIG. 4), where the EM field perturbation signal is extracted.

Having taught the basis for the functionality of the sensing technology, it is important to realize (a) that the displacement is sensed as a perturbation to the resonator 1 functionality through the interaction of the EM fields alone and (b) as long as the conductor, insulator, or semiconductor is in close proximity to the resonator, the structure that holds the conductor, insulator, or semiconductor object that is displace is inconsequential.

These features allow the design of the displacing structure to be independently done from the design of the electronics. Since there is no physical contact between the conductor, insulator, or semiconductor object and the resonator, the mechanical aspects of the transducer are de-coupled from the electronic aspects of the transducer. This allows for the best of both designs, as opposed to an engineering compromise as is required in today's state of the art transducer design. For example, in current load cell design, the strain gauges are directly mounted on the load cell body. This necessarily requires, for example, that the strain gauges be compatible with the load cell material, that the load cell design necessarily only stresses a certain amount so that it doesn't exceed the stress limits of the strain gage, and that the bonding epoxy is compatible with both load cell material and strain gage material. Clearly, according to prior art designs, one cannot choose the design of the strain gauge independently from the load cell body if one wants optimum performance.

Our invention is profoundly different. Since the only interaction between the mechanically deflecting body component and the spiral resonator component is via the EM fields, with no physical contact between the two, each component can be designed independently. As long as the load cell displaces the requisite amount, the resonator does not care how that is accomplished. As long as the resonator does not come in contact with the mechanically deflecting body component, the mechanical part of the transducer does not care how the electronics function.

This independence of design allows the engineer to optimize and maximize the design of the overall transducer as two independent non-overlapping tasks which greatly improves and opens whole new design considerations not available to the transducer designer before.

By only having the resonator influenced by close proximity conductor, insulator, or semiconductor material, the transducer body can be constructed using virtually any available material. For example, load cells as contemplated herein can be constructed of metal, plastic, wood, ceramic, brick, even biological materials such as bone—as long as some conductor, insulator, or semiconductor material can be placed within close proximity of the resonator, and it displaces the prescribed amount as in part (a) the load cell will function appropriately. This construction material independence applies equally as well to others sensing applications such as pressure sensors, accelerometers, velocity meters, and the like.

This complete construction material independence in transducer design is not possible with current state of the art technology. As indicated above, the mechanically deflecting structure can be completely independently designed and constructed from that of the electronics sensing circuit.

Figure 6:
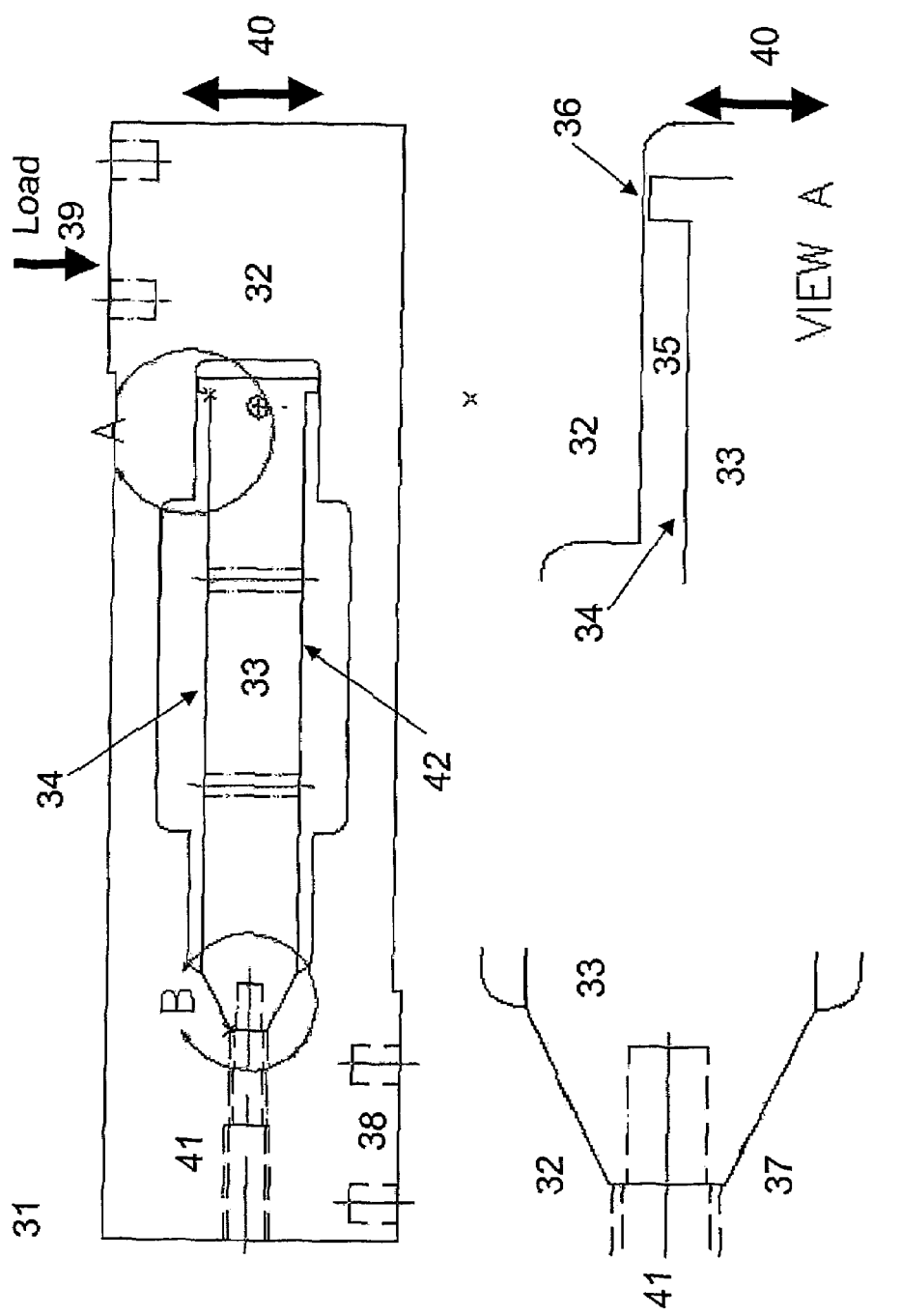
FIG. 6 is one preferred embodiment of the transducer mechanical structure, that of the dual beam load cell.

As illustrated in FIG. 6, a preferred embodiment of the mechanical construction of the load cell application is a dual beam configuration 31. As is clearly understood, any of a myriad other topologies for load cells can be chosen based on construction, performance, and cost requirements without loss of generality to our invented approach for load cell design. The transducer of FIG. 6 consists of two independent components, the load cell body 32 and the electronics mounting block 33. In the preferred embodiment both are made of standard aluminum, however, they can independently be made of different materials as taught herein. For example, both can be made of ceramic, one can be made of plastic while the other is made of aluminum, both can be made of wood, and so on. The two components are mated together is such a way as to fix their position relative to each other. In the illustrated embodiment, a V groove key way 37 is, used in combination with a screw 41 that affixes the two (see, e.g., "VIEW B"). Any configuration of keyway, screw, epoxy, weld, or combination thereof can be used to constrain the relative position of one component to the other. Non-permanent fixation can be used to be able to swap different configuration components 32 and 33 if so desired. The circuit board that contains the sensing electronics is mounted on surface 34 and/or 42 of the mounting block 33 for either single ended or differential measurement capability.

With reference to "VIEW A" of FIG. 6, the electronics circuit board (not shown) containing the resonator and other circuitry is mounted on mounting block 33 along the surface 34. A specified gap 35 is left between the mounting block 33 and the load cell body 32. A change in gap width 35, which results from the deflection 40 caused by load 39 on the load cell body 32, causes the perturbation in the EM field that "leaks" out from the resonator circuitry.

In a preferred embodiment, the gap 35, with the circuitry mounted, is 0.090". For full scale output of the circuitry to be achieved, the load cell body 32 needs only to deflect 0.003". Accordingly, hence the gap width 35, the "stand off distance" is close to two orders of magnitude larger than the actual deflection 40. Since the deflection 40 is small compared to the gap width 35, a deflection "stop" 36 may be added to the mounting block in order to arrest the deflection should an overload condition be present. This stop prevents the impact of load cell body 32 directly onto the circuit board, thereby preventing possible damage. The preferred embodiment's dimensions are 6 inches long by 1.5 inches wide by 1 inch thick, made out of standard aluminum and having a rated load of 10 pounds.

Figure 7:
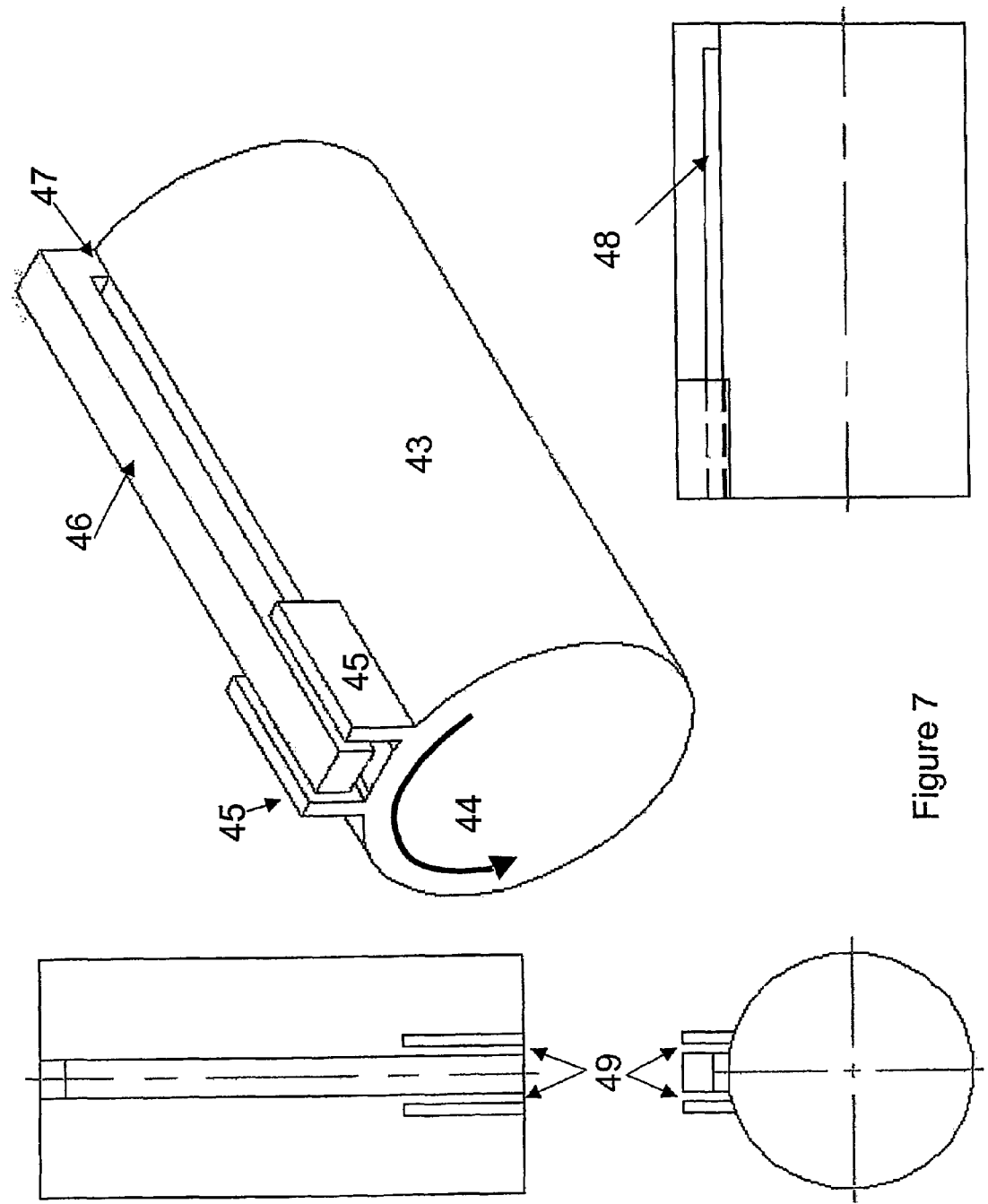
FIG. 7 is another preferred embodiment of the transducer mechanical structure, that of the torque sensor.

The same principles taught herein may be used for the construction of a torque transducer. Torque transducers can be either static or dynamic, and the embodiment taught herein can be used for either implementation, with no loss in generality for other configurations as well. One skilled in the art of transducer design will immediately recognize that the torque transducer is an analog of the load cell, with the difference being that the load cell is described using a rectilinear coordinate system while the torque transducer is described using a cylindrical coordinate system. Referring to FIG. 7, a torque transducer body 43 contains two fixed vertical plates 45 at one end of the cylinder (this is the cylindrical analog to the load cell body 32 of FIG. 6). The electronics mounting block 46 is anchored to the torque transducer body at the other end of the cylinder 47. A gap 48 is left between transducer body 43 and mounting block 46 so that mounting block 46 is suspended above transducer body 43. Gaps 49 are also left between mounting block 46 and vertical plates 45. As a torque 44 is applied to the end of the cylinder, vertical plates 45 will rotate and hence move closer or further away from the electronics mounting block 46. Since mounting block 46 is fixed to the torque transducer at end 47, where no relative torque is applied, beam 46 remains stationary as vertical plates 45 displace due to applied torque 44.

Affixing the resonators 1 of FIG. 1 on the mounting block 46 of FIG. 7 so that they are within the gaps 49, when the relative torque is applied, EM fields of the resonators 1 are perturbed as vertical plates 45 displace due to torque 44, and the invention operates as previously described.

From the two widely diverse preferred embodiments of this invention (i.e., load cells and torque sensors), it is clear that the only requirement for measurement is the perturbation of the EM field by the displacement of the bending structure, without regard for what causes the displacement to occur. Therefore, without loss of generality, any configuration that produces a displacement that perturbs the EM filed will produce the desired measurement effect in the sensing electronics. Hence, virtually any force/displacement/deflection sensor (for example, including pressure, acceleration, velocity, torque, rotational displacement and linear displacement sensors) can be realized using the invention taught herein.

Figure 8:
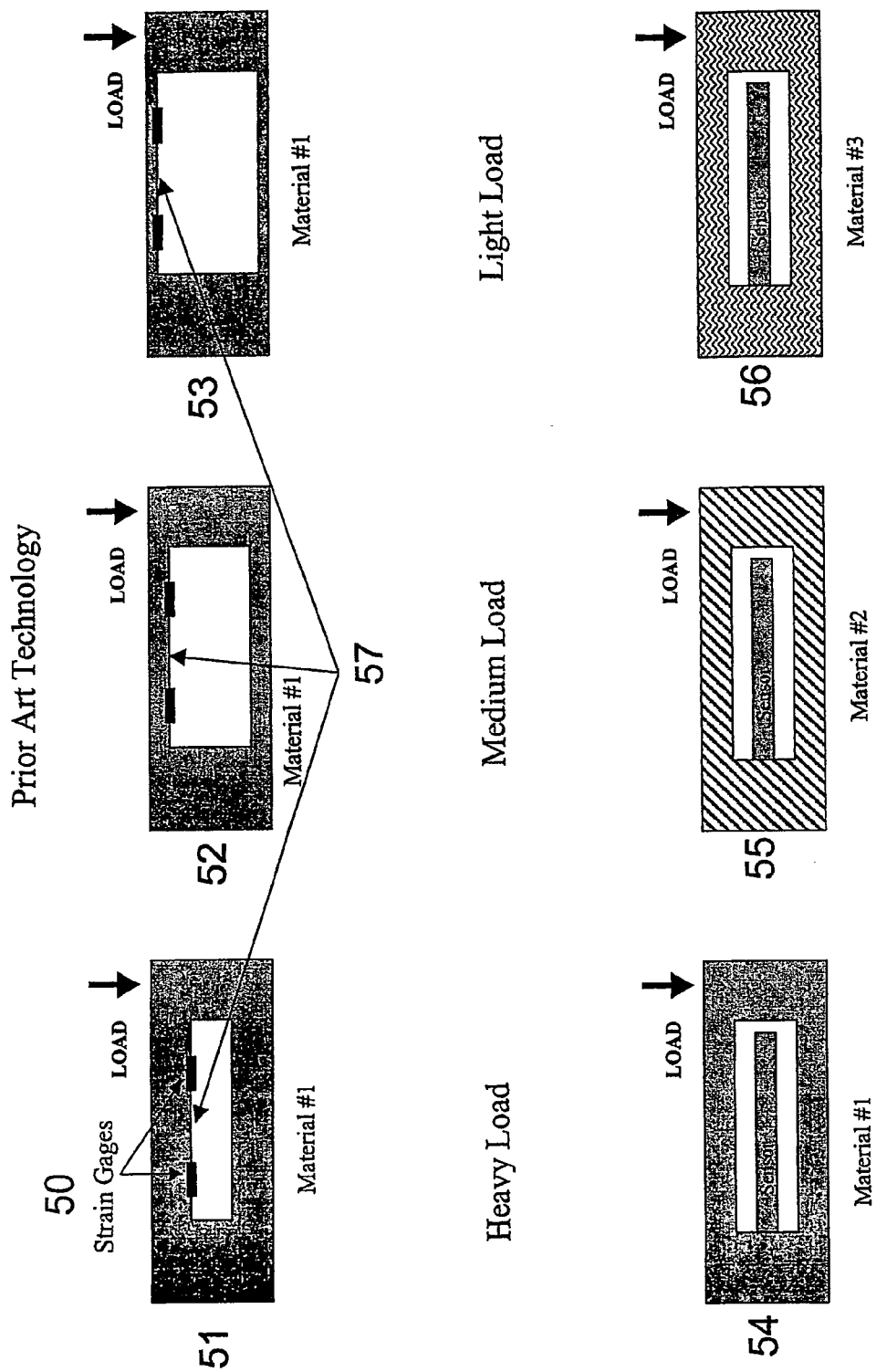
FIG. 8 is an illustration of the construction and material advantages of the invention taught herein.

Additionally, by transducing the measurement using the transducer's body mechanically deflecting structure and the electronics circuitry as two wholly, independently constructed assemblies with no physical reliance of one on the other, many manufacturing advantages and reduction in costs for transducer assembly and testing can now be realized. Combining the key sensor and system concepts, allows for profound influences in the manufacturing process of transducers. Not only can the process be streamlined and automated, but the cost of production can be dramatically reduced. Let us tale for example the design of a load cell product line as shown in FIG. 8.

Current prior art requires the design of many different load cells to cover the ranges of load needed to be sensed. A typical dual beam load cell design covering the range from light loads to heavy loads might entail the design of numerous variations on a common design. For example, the prior art strain gauges 50 could be placed in varying load cell designs, 51, 52, and 53 to cover the desired range. Although the load cells are all made out of the same material, such as aluminum, each load cell need be substantially different to accommodate the different load conditions for which the load cell is designed. A simple way in which to do this is by progressively thinning the dual beams 57 in each load cell design in order to accommodate the progressively lighter load. Thinner beams 57, of course lead to functionality, reliability, fatigue and robust issues which have made light load (<1lb) load cells very expensive. Additionally, a manufacturer now needs to keep many different designs on hand. The associated configuration management of such designs is unwieldy at best and causes undue expense.

Ideally one would like to have a single robust design that covers all ranges. This invention, as taught herein, allows for such a single robust design. As the load cell and resonator are independently designed one can simply keep a single load cell body design and simply vary the material of which the load cell body is constructed. For example, as illustrated in FIG. 8, a load cell of aluminum, 55, will be more compliant than a load cell of stainless steel, 54, but less compliant than one constructed of PVC, 56. However, all three examples will have identical form factors, beam widths, and topologies—the aluminum load cell will deflect, say, 0.003" for a 100 lb load while the PVC load cell will also deflect 0.003", but for a 1 lb load. As far as the transducer electronics are concerned all they need to see is a 0.003" deflection-they don't care how it happened or what material was used to make it happen. Therefore, although load cells 54-56 are identical in physical shape and form, the choice of construction material allows the full load range to be covered. Hence, by using a constant thicker beam functionality, reliability, fatigue and robust issues, associated with prior art constructions are drastically reduced with the present invention.

Once again, it is critical to realize that the displacement is sensed as a perturbation to the EM field produced by the resonator. This means that, if the perturbing object (conductor, insulator, or semiconductor) is not present within the EM field, the resonator will continue to function, although at a different frequency, phase or amplitude, then when the object is present. In essence, the entire electronics circuit works regardless of the presence of the perturbing object. The perturbing object simply allows the circuit to work in the way that it is described herein and envisioned for transducer design. This distinction is important, as it allows the electronics circuit to be fully designed, assembled, and tested independently of its assembly within the overall transducer. This independent assembly and test are not possible with prior art. Traditional strain gauge load cells have the strain gauge directly epoxied to the transducer body, and will not function as strain gauges unless so attached. Capacitive load cells need both the load cell body and the electronics to form the capacitor which is to be measured, and also cannot function unless the entire load cell is constructed. The invention as taught here is uniquely different in that both assemblies, the electronics and the mechanical deflecting structure of the load cell body, can be fully and independently constructed and tested prior to assembly as a load cell. Additionally, the materials of construction are themselves in no way effected by the transducer design. This is not the case for prior art strain gauge devices in that the actual strain gauge must be strained so that the embedded sensing wire, such as Constantan, undergoes a physical material characteristic change in order to sense the load, i.e. its resistance changes as strain is applied. As taught herein, the electronic circuit and components undergo no physical change in material characteristics in order to sense the required load.

Figure 9:
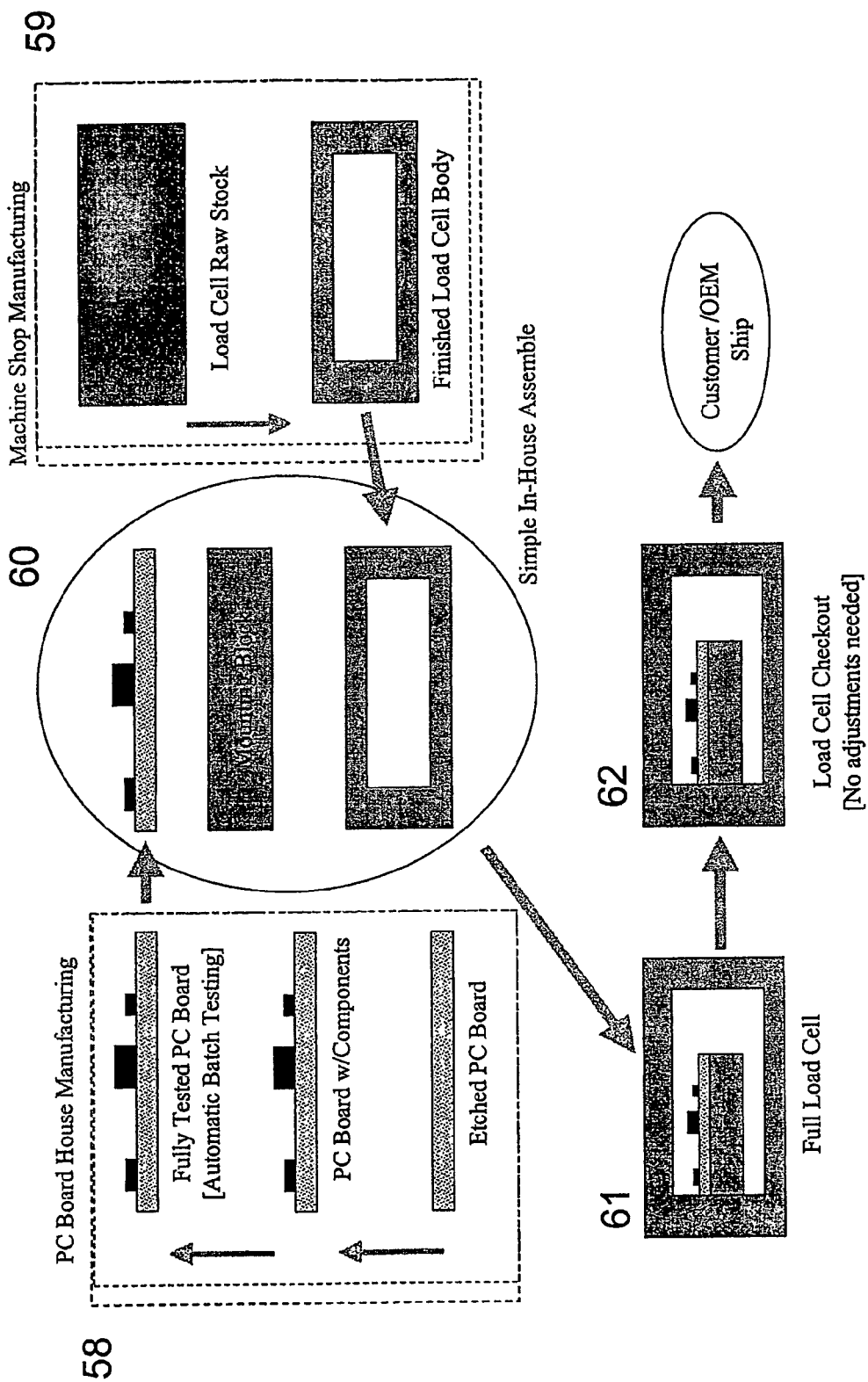
FIG. 9 is an illustration of the manufacturing, assembly, and testing advantages of the invention taught herein.

A canonical production process of a typical load cell as taught in this disclosure is shown in FIG. 9. The manufacturing of the transducer starts from two independent assemblies. The first assembly is the electronics assembly 58 which is produced, for example, by a printed circuit board manufacturer. The circuit board is designed, etched, populated, and tested with the appropriate electronics such are illustrated in FIG. 3. In parallel, the transducer body, in this case the dual beam load cell 59, is separately and independently designed and manufactured, for example by a machine shop, with the only requirement being that the deflection designed for, corresponds to the deflection that the electronics will react to in the prescribed manner.

The two assemblies are brought together (see, e.g., illustration 60) and assembled into the finished product 61. The assembly can be done, for example, using automated machinery. The mechanism for attaching one assembly with the other to form the completed transducer can be as simple as screws, for example, or as complex as keyways and epoxy. At this time, all necessary cabling and connectors can be combined with the transducer assemblies. Since both assemblies cane be been validated prior to transducer assembly 61, only simple testing of the finished product (see, e.g., illustration 62) for functionality and quality assurance need be done. Typical "Test and Tune" tasks are not required, and whatever testing need be done can be fully automated as well. Hence, the primary cost of the transducer is the individual assemblies while the cost of assembly and test, traditionally expensive with prior art strain gauge technology, is greatly reduced.

Figure 10:
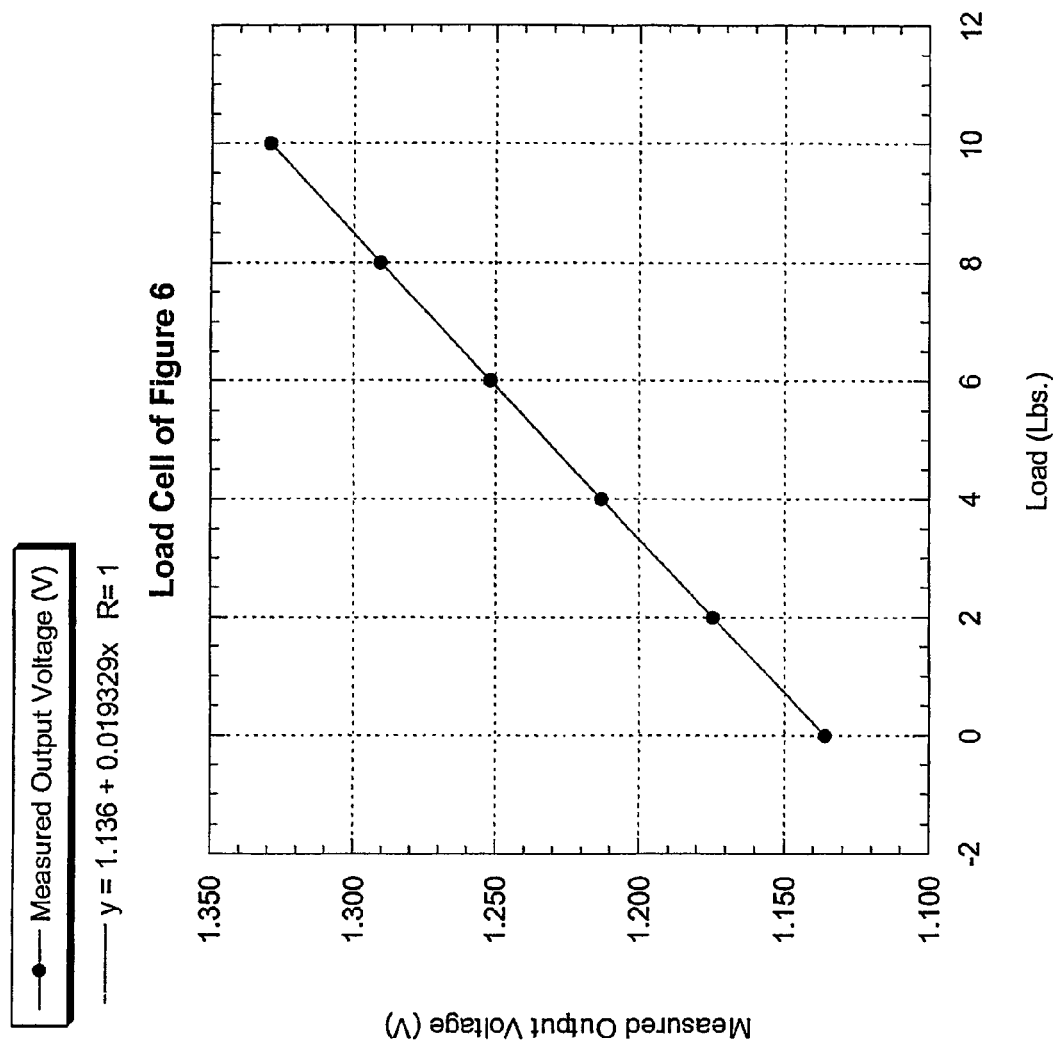
FIG. 10 are the measured results of a load cell constructed as taught herein, in the embodiment of FIG. 6.

Measured results for a load cell as taught herein, and as constructed as in FIG. 6, are illustrated in FIG. 10. The measured results and the corresponding straight line curve fit are shown for a 10 Lbs. rated load cell. The "as measured" linearity of the load cell output signal is 0.01% deviation from a theoretical endpoint to endpoint straight line. There results provided here are for raw data. There has been no added amplification, signal conditioning, data manipulation or linearization that is typically associated with prior art load cell measurements.

The foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A method for detecting an operation of a sensing device that operates by producing a physical displacement effect, the method comprising the steps of:
   selecting an electrical component structure capable of producing an electromagnetic field in response to an applied radio frequency signal that extends from said electrical component structure;
   placing the electrical component structure in proximity to a physical component of the sensing device that is displaced by operating the sensing device;
   applying a radio frequency signal to the electrical component structure;
   operating the sensing device to displace the physical component, such that the displaced physical component perturbs the electromagnetic field without physically contacting the electrical component structure;
   monitoring an output signal affected by the electromagnetic field; and
   detecting an operation of the sensing device according to a change in the output signal, said detected change indicating the displacement of the physical component.

2. The method of claim 1, wherein the change in the output signal is detected as a change in at least one of a frequency, phase and amplitude of the output signal.

3. The method of claim 1, wherein said detecting step further includes the step of:
   comparing the output signal to a reference signal.

4. The method of claim 3, wherein said reference signal is affected by a second electromagnetic field produced by a second electrical component structure, wherein said second electromagnetic field is unperturbed by any physical component.

5. The method of claim 3, wherein said reference signal is affected by a second electromagnetic field produced by a second electrical component structure, wherein said second electromagnetic field is perturbed by the physical component, a second output signal is affected by the second electromagnetic field, and operation of the sensing device is detected according to a differential measurement of the change in the output signal and a change in the second output signal.

6. A sensing device that operates by producing a physical displacement effect, said sensing device comprising:
   an electrical component structure that produces an electromagnetic field in response to an applied radio frequency signal, said electromagnetic field extending from said electrical component structure;
   a physical component displaced by operating the sensing device; and
   a monitoring circuit for monitoring an output signal affected by the electromagnetic field and detecting an operation of the sensing device according to a change in the output signal, said detected change indicating a displacement of the physical component;
   wherein said physical component is positioned relative to the electronic component structure such that the physical component perturbs the electromagnetic field without physically contacting said electrical component structure.

7. The sensing device of claim 6, wherein the physical component is made of metal.

8. The sensing device of claim 6, wherein the physical component includes a dielectric material.

9. The sensing device of claim 6, wherein the physical component includes a semiconductor material.

10. The sensing device of claim 6, wherein the physical component comprises a material selected from the group consisting of metals, plastics, biological materials, frozen liquids, wood, ceramics, brick and concrete.

11. The sensing device of claim 6, wherein the sensing device is selected from the group consisting of load cells, pressure sensors, pressure switches, accelerometers, proximity sensors, proximity switches, weighing sensors, linear displacement sensors, angular displacement sensors, linear encoders, velocity meters and flow meters.

12. The sensing device of claim 6, wherein the electrical component structure has a planar structure.

13. The sensing device of claim 6, wherein the electrical component structure has a non-planar structure.

14. The sensing device of claim 6, wherein the electrical component structure is a transverse electromagnetic (TEM) structure.

15. The sensing device of claim 6, wherein the electrical component structure is a non-transverse electromagnetic (non-TEM) structure.

16. The sensing device of claim 12, wherein the planar structure is selected from the group consisting of distributed transmission structures, open-ended waveguides, dielectric waveguides, co-planar waveguides (CPWs), interdigital capacitors and microstrips.

17. The sensing device of claim 12, wherein the electrical component structure is a spiral resonator.

18. The sensing device of claim 6, wherein the physical component is linearly displaced along an axis that is parallel to a plane of the electrical component structure.

19. The sensing device of claim 6, wherein the physical component is linearly displaced along an axis that is non-parallel to a plane of the electrical component structure.

20. The sensing device of claim 6, wherein the change in the output signal has a linear relationship with respect to a distance displaced by the displacement of the physical component.

21. The sensing device of claim 6, further comprising:
   at least a second electrical component structure capable of producing a second electromagnetic field in response to the applied radio frequency signal.

22. The sensing device of claim 21, wherein said monitoring circuit detects the change in the output signal by comparing the output signal to a reference signal that is affected by the second electromagnetic field, wherein the second electromagnetic field is unperturbed by any physical component.

23. The sensing device of claim 21, wherein said second electromagnetic field is perturbed by the physical component to produce a second output signal, and wherein said monitoring circuit detects the change in the output signal by detecting a differential measurement of change in the output signal and the second output signal.

24. A transducer for sensing a displacement of a physical component of a sensing device, said transducer comprising:
   a substrate;
   an electrical component structure that produces an electromagnetic field in response to an applied radio frequency signal, said electromagnetic field extending from said electrical component structure; and a monitoring circuit for monitoring an output signal affected by the electromagnetic field and detecting a perturbation in the electromagnetic field resulting from a displacement of a physical component through a portion of the extended electromagnetic field.

25. The transducer of claim 24, further comprising:

a second electrical component structure that produces a second electromagnetic field in response to the applied radio frequency signal, said second electromagnetic field extending from said second electrical component structure;

wherein said monitoring circuit detects the displacement of the physical component by comparing the output signal to a reference signal that is affected by the second electromagnetic field, wherein said second electromagnetic field is unperturbed by any physical component.

26. The transducer of claim 25, wherein each of said electrical component structure and said second electrical component structure comprises a spiral resonator.

27. The transducer of claim 26, wherein said monitoring circuit further comprises a first inverter for inverting transforming an output signal of said electrical component structure to a first pulse stream;

a second inverter for inverting transforming an output signal of said second electrical component structure to a second pulse stream;

an exclusive-or (XOR) circuit inputting said first and second pulse streams and outputting a pulse width modulation (PCM) stream, said PCM stream being linearly proportional to a phase difference between said output signal of said electrical component structure and said output signal of said second electrical component structure; and a low pass filter for converting said PCM stream to a direct current (DC) voltage.

28. A load cell, comprising:

a body having a beam, said beam having a displacement end that is displaced upon application of a load in proximity to said displacement end;

a transducer, said transducer including:

a substrate, an electrical component structure mounted to the substrate that produces an electromagnetic field in response to an applied radio frequency signal, said electromagnetic field extending from said electrical component structure, and a monitoring circuit mounted to the substrate for monitoring an output signal affected by the electromagnetic field and detecting an operation of the sensing device according to a change in the output signal, said detected change indicating a displacement of the physical component; and a mounting block for mounting the substrate to the body such that the displacement end is in proximity to said electrical component structure such that a displacement of the physical component perturbs the electromagnetic field without physically contacting said electrical component structure.

29. The load cell of claim 28, wherein said mounting block is removably mounted to the body.

30. The load cell of claim 28, wherein said electrical component structure comprises:

a spiral resonator mounted on a first side of the substrate;

a ground plane mounted on an opposing side of the substrate; and a via that pierces the substrate to electrically interconnect the spiral resonator to the ground plane.

31. The load cell of claim 28, wherein said transducer further comprises:

a second electrical component structure capable of producing a second electromagnetic field in response to the applied radio frequency signal;

wherein said monitoring circuit detects the change in the output signal by comparing the output signal to a reference signal that is affected by the second electromagnetic field, wherein the second electromagnetic field is unperturbed by any physical component.

32. The load cell of claim 28, further comprising:

a second electrical component structure mounted to a second substrate that produces a second electromagnetic field in response to the applied radio frequency signal, said second electromagnetic field extending from said second electrical component structure, said substrate and said second substrate being attached to opposing sides of the mounting block;

a second beam of the body having a second displacement end, said second displacement end being positioned in proximity to said second electrical component structure and linked to said displacement end that is positioned in proximity to said electrical component structure;

wherein said monitoring circuit detects the change in the output signal by monitoring a second output signal affected by the second electromagnetic field and detecting a differential change between each of the output signal and the second output signal.

33. The transducer of claim 25, wherein said monitoring circuit her comprises:

a first amplitude detector for detecting a first amplitude of the output signal of said first electrical component structure;

a second amplitude detector for detecting a second amplitude of the output signal of said second electrical component structure; and a differential amplifier for detecting a difference relationship between said first amplitude and said second amplitude.

34. The sensing device of claim 6, further comprising:

a substrate, wherein the electrical component structure and monitoring circuit are mounted on the substrate; and a mounting block for mounting the substrate to a body of the sensing device.

35. The sensing device of claim 34, wherein said mounting block is removably mounted to the body.

36. The sensing device of claim 6, wherein the electrical component structure includes a first antenna, and the monitoring circuit are remotely located and coupled to a second antenna and a power circuit, such that a wireless, passive link is thereby formed between the power circuit and the electrical component structure and the monitoring circuit and the electrical component structure.

37. The transducer of claim 25, wherein said monitoring circuit comprises a phase locked loop for detecting a phase change in the output signal.

38. A torque transducer comprising:

a cylindrical body having at a beam, said body further including at least one vertical plate radially extending at one longitudinal end of said cylindrical body;

a transducer, said transducer including:
  a substrate,
  an electrical component structure mounted to the substrate that produces an electromagnetic field in response to an applied radio frequency signal, said electromagnetic field extending from said electrical component structure, and
  a monitoring circuit mounted to the substrate for monitoring an output signal affected by the electromagnetic field; and
a mounting block mounted to the cylindrical body at a second longitudinal end in opposition to said first longitudinal end, and fixedly holding the substrate so that said electrical component structure is in proximity to the at least one vertical plate;
wherein a torsional force applied at the first longitudinal end of the cylindrical body causes a displacement of the at least one vertical plate in relation to the electrical component structure that perturbs the electromagnetic field without physically contacting said electrical component structure, and said monitoring circuit detects a change in the output signal indicative of the perturbation to the electromagnetic field and the displacement of the at least one vertical plate.

* * * * *